United States Patent
Ohmori et al.

(10) Patent No.: US 11,211,627 B2
(45) Date of Patent: Dec. 28, 2021

(54) ELECTROCHEMICAL CELL INCLUDING CATHODE WITH MAIN PHASE OF PEROVSKITE OXIDE AND SECOND PHASE OF SRSO4 AND (CO, FE)3O4

(71) Applicant: NGK INSULATORS, LTD., Nagoya (JP)

(72) Inventors: Makoto Ohmori, Nagoya (JP); Shinji Fujisaki, Kuwana (JP); Takashi Ryu, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 43 days.

(21) Appl. No.: 16/299,865

(22) Filed: Mar. 12, 2019

(65) Prior Publication Data
US 2019/0207240 A1 Jul. 4, 2019

Related U.S. Application Data

(63) Continuation of application No. PCT/JP2018/026342, filed on Jul. 12, 2018.

(30) Foreign Application Priority Data

Nov. 28, 2017 (JP) .............................. JP2017-227887

(51) Int. Cl.
*H01M 8/1246* (2016.01)
*H01M 8/0217* (2016.01)
*H01M 8/124* (2016.01)

(52) U.S. Cl.
CPC ....... *H01M 8/1246* (2013.01); *H01M 8/0217* (2013.01); *H01M 2008/1293* (2013.01); *H01M 2300/0074* (2013.01)

(58) Field of Classification Search
CPC ............. H01M 8/0217; H01M 8/1246; H01M 2008/1293
See application file for complete search history.

(56) References Cited

U.S. PATENT DOCUMENTS

| | | |
|---|---|---|
| 2012/0308915 A1 | 12/2012 | Park et al. |
| 2015/0024302 A1 | 1/2015 | Kobayashi et al. |

(Continued)

FOREIGN PATENT DOCUMENTS

| | | |
|---|---|---|
| JP | 2006-032132 A | 2/2006 |
| JP | 2015-038858 A | 2/2015 |

(Continued)

OTHER PUBLICATIONS

English translation of International Preliminary Report on Patentability and Written Opinion of the International Searching Authority, issued in corresponding International Application No. PCT/JP2018/026342, dated Oct. 16, 2018 (8 pages).

(Continued)

*Primary Examiner* — Tracy M Dove
(74) *Attorney, Agent, or Firm* — Flynn Thiel, P.C.

(57) ABSTRACT

The electrochemical cell according to the present invention has an anode, a cathode, and a solid electrolyte layer disposed between the anode and the cathode. The cathode includes a solid electrolyte layer-side region within 3 µm from a surface on the solid electrolyte layer side. The solid electrolyte layer-side region has a main phase that is configured by a perovskite oxide, and a second phase that is configured by $SrSO_4$ and $(Co, Fe)_3O_4$. The perovskite oxide is expressed by the general formula $ABO_3$ and contains at least one of Sr and La at the A site. The $(Co, Fe)_3O_4$ contained in the electrolyte layer-side region contains Co (Continued)

and Fe. An occupied surface area ratio of the second phase in a cross section of the solid electrolyte layer-side region is less than or equal to 10.5%.

2 Claims, 1 Drawing Sheet

(56) References Cited

U.S. PATENT DOCUMENTS

2015/0349349 A1   12/2015   Ohmori et al.
2017/0062838 A1    3/2017   Ohmori

FOREIGN PATENT DOCUMENTS

| JP | 2017-017007 A | 1/2017 |
| JP | 2018-026340 A | 2/2018 |
| WO | WO 2014/168071 A1 | 10/2014 |

OTHER PUBLICATIONS

Japanese Language International Search Report and Written Opinion for corresponding PCT/JP2018/026342, dated Oct. 16, 2018 (10 pgs).

English translation of the International Search Report issued in PCT/JP2018/026342 dated Oct. 16, 2018 (2 pages).

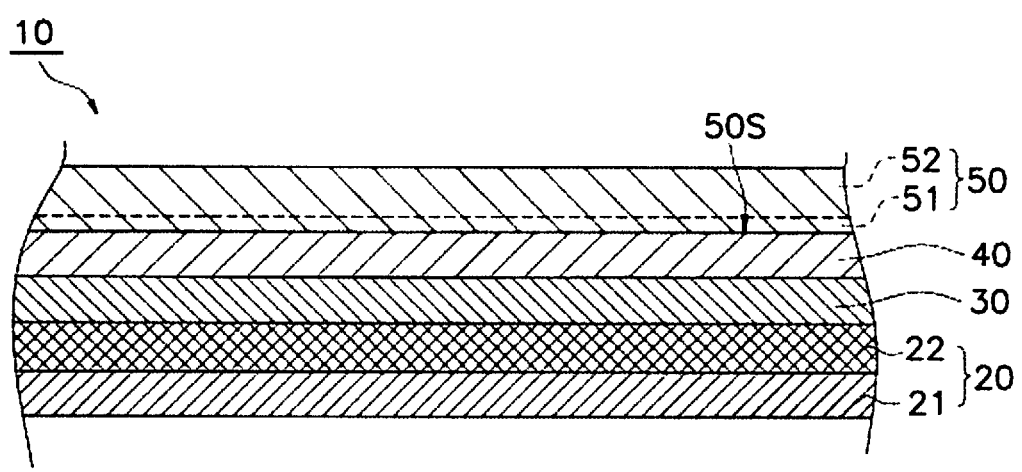

ELECTROCHEMICAL CELL INCLUDING CATHODE WITH MAIN PHASE OF PEROVSKITE OXIDE AND SECOND PHASE OF SRSO4 AND (CO, FE)3O4

CROSS-REFERENCE TO RELATED APPLICATIONS

This is a continuation of PCT/JP2018/026342, filed Jul. 12, 2018, which claims priority to Japanese Application No. 2017-227887, filed Nov. 28, 2017, the entire contents of which are hereby incorporated by reference.

TECHNICAL FIELD

The present invention relates to an electrochemical cell.

BACKGROUND ART

In recent years, fuel cells that are a type of electrochemical cell have attracted attention in light of environmental problems and their effective use as an energy source.

A fuel cell generally includes an anode, a cathode and a solid electrolyte layer disposed between the anode and the cathode.

The cathode, for example, is configured with a perovskite oxide such as (La,Sr)(Co,Fe)O$_3$:(lanthanum strontium cobalt ferrite) or the like (for example, reference is made to Japanese Patent Application Laid-Open No. 2006-32132).

SUMMARY

However, fuel cell output may be reduced by repetitive power generation. The present inventors have gained the new insight that one cause of a reduction in output results from deterioration of the cathode, and that such deterioration of the cathode is related to the total proportion of SrSO$_4$ and (Co, Fe)$_3$O$_4$ that is introduced into a region of the cathode on the solid electrolyte layer side.

The present invention is based on the new insight above, and has the object of providing an electrochemical cell that is configured to inhibit a reduction in output.

The electrochemical cell according to the present invention has an anode, a cathode, and a solid electrolyte layer disposed between the anode and the cathode. The cathode includes a solid electrolyte layer-side region within 3 μm from a surface on the solid electrolyte layer side. The solid electrolyte layer-side region has a main phase that is configured by a perovskite oxide, and a second phase that is configured by SrSO$_4$ and (Co, Fe)$_3$O$_4$. The perovskite oxide is expressed by the general formula ABO$_3$ and contains at least one of Sr and La at the A site. The (Co, Fe)$_3$O$_4$ contained in the electrolyte layer-side region contains Co and Fe. An occupied surface area ratio of the second phase in a cross section of the solid electrolyte layer-side region is less than or equal to 10.5%.

The present invention provides an electrochemical cell that is configured to inhibit a reduction in output.

BRIEF DESCRIPTION OF DRAWINGS

FIG. 1 is a cross sectional view illustrating a configuration of a fuel cell.

DESCRIPTION OF EMBODIMENTS

Configuration of Fuel Cell 10

The configuration of the fuel cell 10 will be described making reference to the drawing. The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, a cylindrical type, or the like.

The fuel cell 10 includes an anode 20, a solid electrolyte layer 30, a barrier layer 40, and a cathode 50.

The anode 20 functions as an anode for the fuel cell 10. As illustrated in FIG. 1, the anode 20 includes an anode current collector 21 and an anode active layer 22.

The anode current collector 21 is a porous body that exhibits a superior gas permeability. The material that is a component of the anode current collector 21 includes the use of a material that is used in the anode current collector of a conventional SOFC and, for example, includes NiO (nickel oxide)-8YSZ (8 mol % of yttria-stabilized zirconia), or NiO—Y$_2$O$_3$ (yttria). However, when NiO is included in the anode current collector 21, at least a portion of the NiO may be reduced to Ni during the operation of the fuel cell 10. The thickness of the anode current collector 21 may be configured, for example, as 0.1 mm to 5.0 mm.

The anode active layer 22 is disposed on the anode current collector 21. The anode active layer 22 is a porous body that is denser than the anode current collector 21. The material that configures the anode active layer 22 includes the use of a material used in an anode active layer of a conventional SOFC and, for example, includes NiO-8YSZ. However, when NiO is included in the anode active layer 22, at least a portion of the NiO may be reduced to Ni during the operation of the fuel cell 10. The thickness of the anode active layer 22, for example, may be 5.0 μm to 30 μm.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable the permeation of oxide ions that are produced by the cathode 50. The solid electrolyte layer 30 is a denser material than the anode 20 or the cathode 50.

The solid electrolyte layer 30 may contain ZrO$_2$ (zirconia) as a principal component. In addition to zirconia, the solid electrolyte layer 30 may contain an additive such as Y$_2$O$_3$ (yttria) and/or Sc$_2$O$_3$ (scandium oxide). These additives function as a stabilizing agent. The mol composition ratio (stabilizing agent:zirconia) of the stabilizing agent to zirconia in the solid electrolyte layer 30 may be configured to be approximately 3:97~20:80. Therefore, the material used in the solid electrolyte layer 30 includes 3YSZ, 8YSZ, 10YSZ, or ScSZ (zirconia stabilized with scandia), or the like. The thickness of the solid electrolyte layer 30, for example, may be configured as 3 μm to 30 μm.

In the present embodiment, the term composition X "contains as a principal component" material Y means that material Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits the formation of a high resistivity layer between the solid electrolyte layer 30 and the cathode 50. The barrier layer 40 is a material that is denser than the anode 20 or the cathode 50. The barrier layer 40 may include a principal component of a ceria-based material such as GDC (gadolinium-doped ceria), SDC (samarium-doped ceria), or the like. The thickness of the barrier layer 40, for example, may be 3 μm to 20 μm.

The cathode 50 is disposed on the barrier layer 40. The cathode 50 functions as a cathode for the fuel cell 10. The cathode 50 is a porous body. There is no particular limitation on the porosity of the cathode 50, and it may be configured to be 20% to 60%. There is no particular limitation on the thickness of the cathode 50 and it may be configured to be 2 μm to 100 μm The cathode 50 contains a first region 51 and a second region 52. The first region 51 is a region within 3 μm from the surface 50S near to the solid electrolyte layer 30. The first region is an example of the "solid electrolyte layer-side region."

In the present embodiment, since the fuel cell 10 includes a barrier layer 40 that is interposed between the solid electrolyte layer 30 and the cathode 50, the first region 51 makes contact with the barrier layer 40. However, when the fuel cell 10 does not include a barrier layer 40, the first region 51 will then make contact with the solid electrolyte layer 30.

When the component densities in a cross section of the cathode 50 and the barrier layer 40 are mapped, the surface 50S near to solid electrolyte layer 30 can be defined with reference to a line of rapid change in the concentration densities.

The first region 51 contains a main phase configured by a perovskite oxide which is expressed by the general formula $ABO_3$ and includes at least one of La or Sr at the A site. The perovskite oxide, for example, may suitably employ a composite perovskite oxide that contains lanthanum, or SSC (samarium strontium cobaltite $(Sm, Sr)CoO_3$) or the like that does not contain lanthanum. However, there is no limitation in this regard. The lanthanum-containing composite perovskite oxide includes LSCF (lanthanum strontium cobalt ferrite): $(LaSr)(CoFe)O_3$), LSF: (lanthanum strontium ferrite: $(La, Sr) FeO_3$), LSC: (lanthanum strontium cobaltite: $(La, Sr)CoO_3$), and LNF (lanthanum nickel ferrite: $La(Ni, Fe)O_3$), or the like. The density of the main phase that is configured with a perovskite oxide may be configured as 5.5 $g/cm^3$ to 8.5 $g/cm^3$.

The occupied surface area ratio of the main phase in a cross section of the first region 51 may be configured as greater than or equal to 89.5% and less than or equal to 99.8%. In the present embodiment, the term "occupied surface area ratio of the material Z in a cross section" denotes the ratio of the sum total surface area of a material Z phase relative to the total surface area of a solid phase in a cross section. The method of calculating the occupied surface area ratio will be described in detail below.

The first region 51 includes a second phase that is configured with $(Co, Fe)_3O_4$ and $SrSO_4$ that have a spinel crystalline structure. In the second phase, $SrSO_4$ and $(Co, Fe)_3O_4$ are not a single compound but rather both are in a mixed configuration. More specifically, a feature such as "$SrSO_4$ and $(Co, Fe)_3O_4$ are mixed" means a configuration in which an EDX spectrum detecting Sr and S and O and an EDX spectrum detecting Co, Fe and O are separately acquired at different sites, and $SrSO_4$ and $(Co, Fe)_3O_4$ are literally mixed (=present in a combined state (Kojien Second Edition, Corrected Version, 15 Oct. 1979, Fourth Publication)). $(Co, Fe)_3O_4$ includes $Co_2FeO_4$, $Co_{1.5}Fe_{1.5}O_4$, and $CoFe_2O_4$, or the like. The density of the second phase may be configured as 5.2 $g/cm^3$ to 6.2 $g/cm^3$. The density of the second phase is less than the density of the main phase.

The occupied surface area ratio of the second phase in a cross section of the first region 51 is less than or equal to 10.5%. The occupied surface area ratio of the second phase is the sum of the occupied surface area ratio of $SrSO_4$ and the occupied surface area ratio of $(Co, Fe)_3O_4$. More specifically, the occupied surface area ratio of the second phase includes the occupied surface area ratio of the particles that are configured as $Sr_3O_4$, the occupied surface area ratio of the particles that are configured as $(Co, Fe)_3O_4$, the occupied surface area ratio of the particles that are configured as a mixture of $SrSO_4$ and $(Co, Fe)_3O_4$ and the occupied surface area ratio of $SrSO_4$ and/or $(Co, Fe)_3O_4$ that are mixed into the particles of the main phase.

Since the inactive part of the inner portion of the first region 51 is reduced when the occupied surface area ratio of the second phase is less than or equal to 10.5%, it is possible to suppress a reduction in the output of the fuel cell 10 during power supply.

It is more preferred that the occupied surface area ratio of the second phase in a cross section of the first region 51 is greater than or equal to 0.2%. In this manner, since the sintering characteristics of the first region 51 are improved by suitably introducing the second phase, the porous backbone structure can be strengthened. As a result, since changes in the fine structure of the cathode 50 can be inhibited, it is possible to suppress cracking of the cathode 50 during power supply.

Although there is no particular limitation in relation to the ratio of the occupied surface area ratio of $SrSO_4$ and the occupied surface area ratio of $(Co, Fe)_3O_4$ in the occupied surface area ratio of the second phase, adding $(Co, Fe)_3O_4$ in a greater amount than $SrSO_4$ is effective for strengthening the backbone structure of the first region 51. For that purpose, the occupied surface area ratio of $(Co, Fe)_3O_4$ is preferably greater than the occupied surface area ratio of $SrSO_4$. The occupied surface area ratio of $SrSO_4$ in a cross section of the first region 51 may be less than or equal to 5%, and the occupied surface area ratio of $(Co, Fe)_3O_4$ in a cross section of the first region 51 may be less than or equal to 9.5%.

Although there is no particular limitation in relation to the distribution of the main phase and the second phase in a cross section of the first region 51, it is preferred that both are distributed in a generally uniform manner.

Although there is no particular limitation in relation to the average equivalent circle diameter of the second phase in the cross section of the first region 51, it is preferably greater than or equal to 0.05 μm and less than or equal to 2.0 μm. In this manner, it is possible to suppress a reduction in the output of the fuel cell 10 during power supply. The average equivalent circle diameter is the value of the arithmetic average of 50 randomly selected circle diameters that respectively have the same surface area as the second phase. The 50 second phases that are the object of average equivalent circle diameter measurement are preferably selected in a random manner from 5 or more positions on an FE-SEM image (magnification 10000 times) on a cross section of the cathode 50. The second phases that are selected in relation to the calculation of the average equivalent circle diameter may be a region that includes both of $SrSO_4$ and $(Co, Fe)_3O_4$, a region that includes only $SrSO_4$, or a region that includes only $(Co, Fe)_3O_4$.

The first region 51 may include a third phase as distinct from the main phase and second phase described above. The components of the third phase may include $Co_3O_4$ (tricobalt tetroxide), CoO (cobalt oxide), SrO (strontium oxide), $SrSO_4$ (strontium sulfate), and an oxide of a component element of the main phase. However, there is no limitation in this regard. The sum total occupied surface area ratio of the third phase in the cross section of the first region 51 is preferably less than 10%.

The second region 52 is a region that is separated by more than 3 μm from the surface 50S near to the solid electrolyte layer 30. The second region 52 is disposed on the first region 51. The second region 52 contains a main phase that is configured by a perovskite oxide which is expressed by the general formula $ABO_3$ and includes at least one of La or Sr at the A site. The occupied surface area ratio of the main phase in a cross section of the second region 52 may be configured as greater than or equal to 95%.

The second region 52 may include a second phase that is configured with $(Co, Fe)_3O_4$ and $SrSO_4$, or may omit a second phase. When the second region 52 contains a second phase, it is preferred that the occupied surface area ratio of the second phase in a cross section of the second region 52 is less than the occupied surface area ratio of the second phase in a cross section of the first region 51.

The second region 52 may include a third phase that is configured by a perovskite oxide as described above, an oxide of a component element of the main phase or the like, or may omit inclusion of a third phase. When the second region 52 contains a third phase, it is preferred that the occupied surface area ratio of the third phase in a cross section of the second region 52 is less than 10%.

Method of Calculation of Occupied Surface Area of Second Phase

Now, the method of calculation of the occupied surface area ratio of the second phase in a cross section of the first region 51 will be described.

Firstly, a cross section of the first region 51 is polished with precision machinery followed by an ion milling process performed using an 1M4000 manufactured by Hitachi High-Technologies Corporation.

Then, an SEM image of a cross section of the first region 51 that is enlarged with a magnification of 10,000 times is obtained by the use of a field emission scanning electron microscope (FE-SEM) that uses an in-lens secondary electron detector.

Next, 3 values corresponding to the contrast of the main phase, second phase and pores are assigned by categorizing the luminosity of the SEM image into 256 gradations. For example, the main phase is displayed as faint gray, the second phase as gray and the pores as black. However, there is no limitation in this regard.

Next, an analysis image highlighting $SrSO_4$ and $(Co, Fe)_3O_4$ is obtained by image analysis of an SEM image using HALCON image analysis software produced by MVTec GmbH (Germany). The total surface area of $SrSO_4$ and $(Co, Fe)_3O_4$ in the analysis image is taken to be the total surface area of the second phase, and the occupied surface area ratio of the second phase is calculated by dividing the total surface area of the second phase by the total surface area of the total solid phase in the analysis image. The analysis described above is performed at 5 positions that are randomly selected on the same cross section of the first region 51, and a value that is the arithmetic average of the ratio of the total surface area of the second phase calculated respectively at 5 positions is the occupied surface area ratio of the second phase in the first region 51.

The respective occupied surface area ratio of $SrSO_4$ and $(Co, Fe)_3O_4$ can be confirmed by component analysis as described below.

Firstly, the position of the second phase is confirmed with reference to the SEM image used in the calculation of the occupied surface area ratio of the second phase. Next, an EDX spectrum at the position of the second phase is obtained using energy dispersive X-ray spectroscopy (EDX). The elements that are present at the position of the second phase are identified by semi-quantitative analysis of the EDX spectrum. In this manner, it can be confirmed that $SrSO_4$ and $(Co, Fe)_3O_4$ are in a mixed configuration in the second phase, and that the occupied surface area ratio of $SrSO_4$ and the occupied surface area ratio $(Co, Fe)_3O_4$ in the second phase can be separately obtained.

Whether $(Co, Fe)_3O_4$ is configured as any of $CoFe_2O_4$, $Co_{1.5}Fe_{1.5}O_4$ or $Co_2FeO_4$ can be confirmed by analysis of the crystalline structure of the second phase (lattice constant, lattice type, crystal orientation) using selected area electron diffraction (SAED) with a transmission electron microscope (TEM).

The calculation method of the occupied surface area ratio for the second phase in the first region 51 has been described above, and the occupied surface area ratio for the main phase and the third phase in the first region 51 or the main phase, second phase and third phase in the second region 52 may be calculated in the same manner.

Cathode Material

The cathode material used to configure the first region 51 is a mixed material in which an $SrSO_4$ starting material powder and a $(Co, Fe)_3O_4$ starting material powder are added to a perovskite oxide starting material powder that is expressed by the general formula $ABO_3$.

The composite perovskite oxide starting material powder includes a starting material powder such as LSCF, LSF, LSC, LNF, SSC, or the like. $(Co, Fe)_3O_4$ includes a starting material powder of $Co_2FeO_4$, $Co_{1.5}Fe_{1.5}O_4$ or $CoFe_2O_4$, or the like.

The total added amount of the $SrSO_4$ starting material powder and $(Co, Fe)_3O_4$ starting material powder that is added to the cathode material is less than or equal to 9.5 wt %. In this manner, it is possible to inhibit the occupied surface area ratio of the second phase in a cross section of the first region 51 to less than or equal to 10.5%.

The total added amount of $SrSO_4$ and $(Co, Fe)_3O_4$ in the cathode material is preferably greater than or equal to 0.18 wt %. In this manner, it is possible to control the occupied surface area ratio of the second phase in a cross section of the first region 51 to greater than or equal to 0.2%.

The occupied surface area ratio of the second phase can be minutely adjusted by adjusting the granularity of each starting material powder or the configuration of the $SrSO_4$ starting material powder and $(Co, Fe)_3O_4$ starting material powder.

Adjusting the granularity of the $SrSO_4$ starting material powder and the $(Co, Fe)_3O_4$ starting material powder enables the adjustment of the average equivalent circle diameter of the second phase in a cross section of the first region 51. Adjusting the granularity of the $SrSO_4$ starting material powder and the $(Co, Fe)_3O_4$ starting material powder is preferably performed by the use of an air classifier. In this manner, accurate classification that includes an upper limiting value and a lower limiting value for the grain diameter is possible.

The cathode material that configures the second region 52 includes the use of a perovskite oxide starting material powder that is expressed by the general formula $ABO^3$. When the second phase is introduced into the second region 52, use is possible of a mixed material in which an $SrSO_4$ starting material powder and a $(Co, Fe)_3O_4$ starting material powder are added to a perovskite oxide starting material powder.

Method of Manufacturing Fuel Cell 10

Next, an example will be described of a manufacture method for the fuel cell 10. In the following description, the term "green body" denotes a member prior to firing.

Firstly, a slurry for the anode current collector is prepared by adding a binder (for example, polyvinyl alcohol) to a mixture of an anode current collector powder (for example, an NIC powder and a YSZ powder) and a pore forming agent (for example, PMMA (polymethylmethacrylate resin)). Next, an anode current collector powder is obtained by drying and granulating the slurry for the anode current collector in a spray drier. Then, a green body for the anode current collector 21 is formed by molding the anode powder using a die press molding method. At that time, a tape lamination method may be used in substitution for the die press molding method.

Next, a slurry for the anode active layer is prepared by adding a binder (for example, polyvinyl alcohol) to a mixture of an anode active layer powder (for example, an NiO powder and a YSZ powder) and a pore forming agent (for example, PMMA). Then, a green body for the anode active layer 22 is formed by printing the slurry for the anode active layer onto the green body for the anode current collector 21 using a printing method. In that manner, a green body for the anode 20 is formed. At that time, a tape lamination method or coating method or the like may be used in substitution for the printing method.

Next, a slurry for the solid electrolyte layer is prepared by mixing a mixture of water and a binder into a solid electrolyte layer powder (for example, a YSZ powder) in a ball mill. Then, a green body for the solid electrolyte layer 30 is formed by coating and drying the slurry for the solid electrolyte layer onto the green body for the anode 20. At that time, a tape lamination method or printing method or the like may be used in substitution for the coating method.

Next, a slurry for the barrier layer is prepared by mixing a mixture of water and a binder into a barrier layer powder (for example, a GDC powder) in a ball mill. Then, a green body for the barrier layer 40 is formed by coating and drying the slurry for the barrier layer onto the green body for the solid electrolyte layer 30. At that time, a tape lamination method or printing method or the like may be used in substitution for the coating method.

Next, a laminated body using the green bodies respectively for the anode 20, the solid electrolyte layer 30 and the barrier layer 40 is cofired at 1300 to 1600 degrees C. for 2 to 20 hours to form a cofired body of the anode 20, the solid electrolyte layer 30 and the barrier layer 40.

Next, a first region slurry is prepared by mixing water and a binder in a ball mill with a mixed material in which an $SrSO_4$ starting material powder and a $(Co, Fe)_3O_4$ starting material powder are mixed with a perovskite oxide starting material powder. Next, a green body for the first region 51 is formed by coating and drying the first region slurry onto the barrier layer 40 of the cofired body.

Next, a second region slurry is prepared by mixing water and a binder with the perovskite oxide starting material powder in a ball mill. Next, the second region slurry is coated and dried onto the green body for the first region 51 to thereby form a green body for the second region 52.

Then, the green bodies for the first region 51 and the second region 52 are fired (1000 to 1100 degrees C. for 1 to 10 hours) in an electrical furnace (in air) to thereby form the cathode 50 on the barrier layer 40.

OTHER EMBODIMENTS

Although an embodiment of the present invention has been described above, the present invention is not limited to the above embodiment, and various changes or modifications may be added within a scope that does not depart from the spirit of the invention.

Although a configuration has been described in which the cathode 50 according to the present invention is applied to the fuel cell 10, in addition to a fuel cell, the cathode of the present invention may be applied to an electrochemical cell having a solid oxide configuration that includes a solid oxide-type electrolytic cell.

In the present embodiment, although the fuel cell 10 comprises the anode 20, the solid electrolyte layer 30, the barrier layer 40 and the cathode 50, there is no limitation in this regard. The fuel cell 10 may comprise the anode 20, the solid electrolyte layer 30, and the cathode 50, or another layer may be interposed between the anode 20 and the solid electrolyte layer 30, or between the solid electrolyte layer 30 and the cathode 50.

EXAMPLES

Although the examples of a cell according to the present invention will be described below, the present invention is not thereby limited to the following examples.

Preparation of Samples No. 1 to No. 20

A fuel cell according to Samples No. 1 to No. 20 was prepared as described below.

Firstly, an anode current collector (NiO:8YSZ=50:50 (Ni volume % conversion)) was formed with a thickness of 500 µm using a die press molding method, and on that layer, an anode active layer (NiO:8YSZ=45:55 (Ni volume % conversion)) was formed with a thickness of 20 µm using a printing method.

Then, a green body for a GDC layer and an 8YSZ layer were sequentially formed using a coating method on the anode active layer and co-fired (1400 degrees C., 2 hours).

Next, as shown in Table 1, the first region material was prepared that includes a main phase (LSCF, LSF or SSC) and a second phase ($SrSO_4$ and $(Co, Fe)_3O_4$). As shown in Table 1, the occupied surface area ratio of the second phase in the first region was varied by varying the added amount of the second phase in each sample. Furthermore, the granularity of the $SrSO_4$ starting material powder and the $(Co, Fe)_3O_4$ starting material powder was adjusted so that the average equivalent circle diameter of the second phase took the values shown in Table 1. In Sample No. 1, No. 2, No. 10, and No. 11, $Co_2FeO_4$ was used as $(Co, Fe)_3O_4$, in Sample No. 3 to No. 5, No. 12, No. 13, and No. 16, $Co_{1.5}Fe_{1.5}O_4$ was used as $(Co, Fe)_3O_4$, and in Sample No. 6 to No. 9, No. 14, No. 15 and No. 17 to No. 20, $CoFe_2O_4$ was used as $(Co, Fe)_3O_4$.

Next, a first region slurry was prepared by mixing the first region material, water and PVA in a ball mill for 24 hours. Next, a green body for the first region of the cathode was formed by coating and drying the first region slurry onto the GDC layer of the cofired body.

Next, a second region slurry was prepared by mixing the main phase material for the second region as shown in Table 1, water and PVA in a ball mill for 24 hours. Next, a green body for the second region of the cathode was formed by coating and drying the second region slurry onto the green body for the first region.

Then, a cathode was formed by firing the green bodies for the first region and the second region for one hour in an electrical furnace (in air at 1000 degrees C.).

Measurement of Occupied Surface Area Ratio of Second Phase

Firstly, after polishing a cross section of the first region of the cathode in each sample with precision machinery, ion milling processing was performed using an IM4000 manufactured by Hitachi High-Technologies Corporation.

Then, an SEM image of five positions in a cross section of the first region enlarged with a magnification of 10,000 times was obtained by the use of FE-SEM that uses an in-lens secondary electron detector. The SEM image was obtained using an FE-SEM (model: ULTRA55 manufactured by Zeiss AG) with a working distance setting of 3 mm and an acceleration voltage of 1 kV. In the SEM image, 3 values were assigned in relation to the contrast of the main phase, the second phase and the pores by categorizing the luminosity of the image into 256 gradations.

Then, the SEM image was configured as an analysis image by the use of HALCON image analysis software produced by MVTec GmbH (Germany) in order to obtain an analysis image that highlights $SrSO_4$ and $(Co, Fe)_3O_4$.

Then, the occupied surface area ratio of the second phase in the first region was calculated respectively at five positions by dividing the total surface area of $SrSO_4$ and $(Co, Fe)_3O_4$ in the analysis image by the total surface area of the solid phase in the analysis image and then calculating the arithmetic average of those values as the occupied surface area ratio for the second phase. Furthermore, an occupied surface area ratio of $SrSO_4$ and an occupied surface area ratio of $(Co, Fe)_3O_4$ in the second phase were separately obtained by acquiring an EDX spectrum at the position of the second phase with reference to the SEM image. The calculation results for the occupied surface area ratio of the second phase in a cross section of the first region are shown in Table 1.

Average Equivalent Circle Diameter of Second Phase

The average equivalent circle diameter of the second phase at 50 randomly selected positions was calculated with reference to the 5 analysis images used in the calculation of the occupied surface area ratio. The calculation results for the average equivalent circle diameter of the second phase in a cross section of the first region are shown in Table 1.

Measurement of Fuel Cell Output

While supplying nitrogen gas to the anode side and air to the cathode side of each sample, the temperature was increased to 750 degrees C. When reaching a temperature of 750 degrees C., hydrogen gas was supplied for 3 hours to the anode to perform a reduction process.

Next, a rated current density value of 0.2 $A/cm^2$ was set, and power generation for 1000 hours was performed while measuring the cell voltage. The voltage drop ratio per 1000 hours was calculated as a deterioration rate.

After 1000 hours of power generation, a cross section of the cathode was observed using an electron microscope to observe cracking in the cathode. Those samples that were observed to have a crack of less than or equal to 5 μm that has a slight effect on the characteristics of the fuel cell are designated in Table 1 as being "present (slightly)."

TABLE 1

| Sample No. | Main Phase of First Region and Second Region | Second Phase of First Region | Occupied Surface Area Ratio of Second Phase in Cross Section of First Region (%) | Occupied Surface Area Ratio of $SrSO_4$ in Cross Section of First Region (%) | Occupied Surface Area Ratio of $(Co,Fe)_3O_4$ in Cross Section of First Region (%) | Average Equivalent Circle Diameter of Second Phase in Cross Section of First Region (μm) | Deterioration Rate (%) | Presence Absence Microscopic Cracks | Evaluation |
|---|---|---|---|---|---|---|---|---|---|
| No. 1 | LSCF | $Co_2FeO_4 + SrSO_4$ | 0.18 | 0.03 | 0.15 | 0.14 | 0.54 | Yes (slight) | ○ |
| No. 2 | LSCF | $Co_2FeO_4 + SrSO_4$ | 0.21 | 0.04 | 0.17 | 0.17 | 0.37 | No | ◎ |
| No. 3 | LSCF | $Co_{1.5}Fe_{1.5}O_4 + SrSO_4$ | 0.40 | 0.06 | 0.34 | 0.35 | 0.45 | No | ◎ |
| No. 4 | LSCF | $Co_{1.5}Fe_{1.5}O_4 + SrSO_4$ | 1.4 | 0.2 | 1.2 | 0.80 | 0.49 | No | ◎ |
| No. 5 | LSCF | $Co_{1.5}Fe_{1.5}O_4 + SrSO_4$ | 3.7 | 0.4 | 3.3 | 1.4 | 0.51 | No | ◎ |
| No. 6 | LSCF | $CoFe_2O_4 + SrSO_4$ | 5.1 | 0.5 | 4.6 | 1.5 | 0.80 | No | ◎ |
| No. 7 | LSCF | $CoFe_2O_4 + SrSO_4$ | 7.3 | 0.6 | 6.7 | 1.7 | 0.88 | No | ◎ |
| No. 8 | LSCF | $CoFe_2O_4 + SrSO_4$ | 10.3 | 2.8 | 7.5 | 2.0 | 1.4 | No | ◎ |
| No. 9 | LSCF | $CoFe_2O_4 + SrSO_4$ | 11.5 | 1.8 | 9.7 | 2.4 | 2.4 | No | X |
| No. 10 | LSF | $Co_2FeO_4 + SrSO_4$ | 0.16 | 0.03 | 0.13 | 0.14 | 0.55 | Yes (slight) | ○ |
| No. 11 | LSF | $Co_2FeO_4 + SrSO_4$ | 4.5 | 0.7 | 3.8 | 1.5 | 0.66 | No | ◎ |
| No. 12 | LSF | $Co_{1.5}Fe_{1.5}O_4 + SrSO_4$ | 7.2 | 0.5 | 6.7 | 1.6 | 0.78 | No | ◎ |
| No. 13 | LSF | $Co_{1.5}Fe_{1.5}O_4 + SrSO_4$ | 9.3 | 0.8 | 8.5 | 1.8 | 1.0 | No | ◎ |
| No. 14 | LSF | $Co_2FeO_4 + SrSO_4$ | 10.1 | 1.5 | 8.6 | 2.1 | 1.5 | No | ◎ |
| No. 15 | LSF | $Co_2FeO_4 + SrSO_4$ | 11.1 | 2.2 | 8.9 | 2.3 | 2.9 | No | X |
| No. 16 | SSC | $Co_{1.5}Fe_{1.5}O_4 + SrSO_4$ | 0.15 | 0.03 | 0.12 | 0.16 | 0.62 | Yes (sight) | ○ |
| No. 17 | SSC | $Co_2FeO_4 + SrSO_4$ | 2.4 | 0.3 | 2.1 | 1.1 | 0.77 | No | ◎ |
| No. 18 | SSC | $Co_2FeO_4 + SrSO_4$ | 6.2 | 0.5 | 5.7 | 1.6 | 0.82 | No | ◎ |
| No. 19 | SSC | $Co_2FeO_4 + SrSO_4$ | 10.0 | 2.1 | 7.9 | 1.8 | 1.1 | No | ◎ |
| No. 20 | SSC | $Co_2FeO_4 + SrSO_4$ | 11.9 | 3.2 | 8.7 | 2.5 | 2.9 | No | X |

As shown in Table 1, a reduction in the output of the fuel cell was suppressed in Sample No. 1 to No. 8, No. 10 to No. 14, and No. 16 to No. 19 in which the occupied surface area ratio of the second phase in a cross section of the first region was suppressed to less than or equal to 10.5%. This feature is due to the reduction in the inactive part in an inner portion of the first region.

In the present embodiment, the effect of the present invention was simply confirmed by preparing a cathode into which a second phase had been introduced into a first region and measuring a deterioration rate after 1000 hours power generation immediately after the manufacture of the fuel cell. However, the results of the present embodiment demonstrate that it is possible to suppress an output reduction of a fuel cell if the occupied surface area ratio of a second phase in a cross section of the first region is suppressed to less than or equal to 10.5% irrespective of the manner of manufacturing or the degree to which the fuel cell is used.

Furthermore cracking of the first region was suppressed in Sample No. 2 to No. 8, No. 11 to No. 14, and No. 17 to No. 19 in which the occupied surface area ratio of the second phase in a cross section of the first region was configured to be greater than or equal to 0.20%. This feature is due to the strengthening of the porous backbone structure by improving the sintering characteristics of the first region with the second phase.

The occupied surface area ratio of $(Co, Fe)_3O_4$ in those samples is generally greater than the occupied surface area ratio of $SrSO_4$, and therefore such a feature exhibits a more useful effect in relation to strengthening of the backbone structure of the first region. However, even when the occupied surface area ratio of $(Co, Fe)_3O_4$ is smaller than the occupied surface area ratio of $SrSO_4$, or even when it is the same, the backbone structure of the first region can be strengthened by a configuration in which the occupied surface area ratio of the second phase is greater than or equal to 0.20%.

In the present embodiment, the effect of the present invention was simply confirmed by preparing a first region into which a second phase is introduced, and observing cracking after 1000 hours power generation immediately after manufacture of the fuel cell. However, the results of the present embodiment demonstrate that it is possible to suppress the production of cracks in the first region if the occupied surface area ratio of the second phase in a cross section of the first region is configured to be greater than or equal to 0.20% irrespective of the manner of manufacturing or the degree of to which the fuel cell is used.

In addition, a further suppression in a reduction of the fuel cell output was enabled in Sample No. 1 to No. 8, No. 10 to No. 13, and No. 16 to No. 19 in which the average equivalent circle diameter of the second phase in a cross section of the first region was configured to be greater than or equal to 0.05 μm and less than or equal to 2.0 μm.

The invention claimed is:

1. An electrochemical cell comprising:
an anode;
a cathode; and
a solid electrolyte layer disposed between the anode and the cathode; wherein
the cathode includes a solid electrolyte layer-side region within 3 μm from a surface on the solid electrolyte layer side, the solid electrolyte layer-side region has a main phase that is configured by a perovskite oxide, and a second phase that is configured by $SrSO_4$ and $(Co, Fe)_3O_4$, the perovskite oxide being expressed by the general formula $ABO_3$ and containing at least one of Sr and La at the A site,
$(Co, Fe)_3O_4$ contained in the electrolyte layer-side region contains Co and Fe,
an occupied surface area ratio of the second phase in a cross section of the solid electrolyte layer-side region is greater than or equal to 0.21% and less than or equal to 10.5%, the occupied surface area ratio of $(Co,Fe)_3O_4$ being from 0.17-9.5% and the occupied surface area ratio of $SrSO_4$ being from 0.04-5%, and
an occupied surface area ratio of $(Co, Fe)_3O_4$ in the cross section of the solid electrolyte layer-side region is greater than an occupied surface area ratio of $SrSO_4$.

2. The electrochemical cell according to claim 1, wherein an average equivalent circle diameter of the second phase in the cross section of the solid electrolyte layer-side region is greater than or equal to 0.05 μm and less than or equal to 2.0 μm.

* * * * *